United States Patent
Gu et al.

(10) Patent No.: US 10,032,033 B2
(45) Date of Patent: Jul. 24, 2018

(54) SYSTEMS AND METHODS FOR PROTECTING BACKED-UP DATA FROM RANSOMWARE ATTACKS

(71) Applicant: Symantec Corporation, Mountain View, CA (US)

(72) Inventors: Lei Gu, Bedford, MA (US); Matt Boucher, Merrimack, NH (US)

(73) Assignee: Symantec Corporation, Mountain View, CA (US)

( * ) Notice: Subject to any disclaimer, the term of this patent is extended or adjusted under 35 U.S.C. 154(b) by 155 days.

(21) Appl. No.: 14/938,868

(22) Filed: Nov. 12, 2015

(65) Prior Publication Data

US 2017/0140156 A1    May 18, 2017

(51) Int. Cl.
| | | |
|---|---|---|
| G06F 21/00 | (2013.01) | |
| G06F 21/60 | (2013.01) | |
| G06F 11/14 | (2006.01) | |
| G06F 21/55 | (2013.01) | |

(52) U.S. Cl.
CPC ........ *G06F 21/602* (2013.01); *G06F 11/1451* (2013.01); *G06F 21/554* (2013.01); *G06F 2221/034* (2013.01)

(58) Field of Classification Search
CPC .. G06F 21/602; G06F 11/1451; G06F 21/554; G06F 2221/034
See application file for complete search history.

(56) References Cited

U.S. PATENT DOCUMENTS

| | | | |
|---|---|---|---|
| 7,315,801 B1 * | 1/2008 | Dowd | H04L 63/1433 |
| | | | 703/13 |
| 7,316,016 B2 * | 1/2008 | DiFalco | H04L 41/0893 |
| | | | 706/45 |
| 8,401,185 B1 | 3/2013 | Telang | |
| 8,549,643 B1 * | 10/2013 | Shou | G06F 21/556 |
| | | | 455/410 |
| 9,003,533 B1 | 4/2015 | Gummerman | |
| 9,063,893 B1 | 6/2015 | Stringham | |
| 9,317,686 B1 * | 4/2016 | Ye | G06F 11/1461 |

(Continued)

OTHER PUBLICATIONS

Tripwire Reference Guide 2.4, Tripwire Inc, Mar 12, 2001, pp. 1-140.*

(Continued)

*Primary Examiner* — Mohammad A Siddiqi
(74) *Attorney, Agent, or Firm* — FisherBroyles, LLP

(57) ABSTRACT

The disclosed computer-implemented method for protecting backed-up data from ransomware attacks may include (1) determining that a backup system periodically backs up at least one file stored at a computing device to a remote storage system by storing a copy of the file at the remote storage system, (2) identifying one or more characteristics of the file backed up by the backup system, (3) storing a tripwire file with the one or more characteristics at the computing device, (4) determining that the file stored at the computing device has likely been encrypted by ransomware executing on the computing device by detecting that the tripwire file has been modified, (5) performing an action that prevents the backup system from replacing the copy of the file at the remote storage system with a copy of the encrypted file. Various other methods, systems, and computer-readable media are also disclosed.

20 Claims, 9 Drawing Sheets

(56) References Cited

U.S. PATENT DOCUMENTS

| | | | | |
|---|---|---|---|---|
| 2007/0283434 | A1* | 12/2007 | Cohen | G06F 21/554 726/22 |
| 2008/0022400 | A1* | 1/2008 | Cohen | G06F 21/554 726/22 |
| 2011/0082838 | A1 | 4/2011 | Niemelä | |
| 2013/0054601 | A1* | 2/2013 | Whitlock | G06F 17/30342 707/737 |
| 2015/0047032 | A1* | 2/2015 | Hannis | H04L 63/1491 726/23 |
| 2015/0172304 | A1 | 6/2015 | Kleczynski | |
| 2016/0180087 | A1* | 6/2016 | Edwards | G06F 21/566 726/24 |
| 2016/0323316 | A1* | 11/2016 | Kolton | H04L 63/145 |
| 2016/0378988 | A1* | 12/2016 | Bhashkar | G06F 21/566 726/24 |

OTHER PUBLICATIONS

Anonymous: "Encrypting Ransomware—an Emerging Threat", Sep. 18, 2013 (Sep. 18, 2013), XP055324178, Retrieved from the Internet: URL:http://northbridgecs.com/blog/encrypting-ransomware-an-emerging-threat [retrieved on Nov. 29, 2016].

Uri Mann; Systems and Methods for Protecting Files From Malicious Encryption Attempts; U.S. Appl. No. 14/265,948, filed Apr. 30, 2014.

Robert Koeten, et al.; Systems and Methods for Automated Aggregation of Information-Source Metadata; U.S. Appl. No. 14/561,244, filed Dec. 5, 2014.

"Download CryptoLocker Tripwire 1.0", http://alexappleton.net/post/83785313416/download-cryptolocker-tripwire-10, as accessed Sep. 17, 2015, alexappleton.net, (On or before Aug. 3, 2015).

"CryptoLocker", https://en.wikipedia.org/wiki/CryptoLocker, as accessed Sep. 17, 2015, Wikipedia, (Oct. 22, 2013).

* cited by examiner

SYSTEMS AND METHODS FOR PROTECTING BACKED-UP DATA FROM RANSOMWARE ATTACKS

BACKGROUND

The variety of malware on the Internet is ever-growing. One such variant of malware is ransomware, which attempts to encrypt important files on a user's computing system and then holds the encrypted files for ransom. If the user does not pay the ransom, the important files remain encrypted and may be impossible for the user to access. CryptoLocker is an example of ransomware that encrypts a user's file systems and demands a ransom in exchange for a decryption key.

Unfortunately, the encryption of a user's files by ransomware may result in data loss, even when the user's computing system is configured to back up the files to another storage location (e.g., using a cloud-based storage service). For example, the encryption of a user's files by ransomware may affect backups of the files because typical backup systems simply mirror the user's files to another storage location. Under these circumstances if a user's computing system comes under a ransomware attack and files stored at the computing system are encrypted, a typical backup system may backup the encrypted files to another storage location leaving the user with two copies of the user's files in an encrypted and inaccessible state and no copies of the user's files in an unencrypted and accessible state. The instant disclosure, therefore, identifies and addresses a need for improved systems and methods for protecting backed-up data from ransomware attacks.

SUMMARY

As will be described in greater detail below, the instant disclosure describes various systems and methods for protecting backed-up data from ransomware attacks. In one example, a computer-implemented method for protecting backed-up data from ransomware attacks may include (1) determining that a backup system periodically backs up at least one file stored at a computing device to a remote storage system by storing a copy of the file at the remote storage system, (2) identifying one or more characteristics of the file backed up by the backup system, (3) storing a tripwire file with the one or more characteristics at the computing device, (4) determining that the file stored at the computing device has likely been encrypted by ransomware executing on the computing device by detecting that the tripwire file has been modified, and (5) performing, in response to detecting that the tripwire file has been modified, an action that prevents the backup system from replacing the copy of the file at the remote storage system with a copy of the encrypted file. In some embodiments, the backup system may use the one or more characteristics to identify files that are to be backed up to the remote storage system.

In some embodiments, the step of storing the tripwire file at the computing device may include (1) identifying an additional file stored at the computing device with the one or more characteristics and (2) generating the tripwire file from the additional file. In some embodiments, the one or more characteristics may include a storage location at the computing device, and the step of storing the tripwire file at the computing device may include storing the tripwire file to the storage location. In other embodiments, the one or more characteristics may include a file type, and the step of storing the tripwire file at the computing device may include generating the tripwire file with the file type. In at least one embodiment, the one or more characteristics may include the most common file type of the files backed up by the backup system, and the step of storing the tripwire file at the computing device may include generating the tripwire file with the most common file type. In at least one embodiment, the tripwire file may be unique to the computing device.

In some embodiments, the step of identifying the one or more characteristics of the file backed up by the backup system may include identifying every combination of characteristics used by the backup system to identify files that are to be backed up to the remote storage system, and the step of storing the tripwire file at the computing device may include, for each combination of characteristics, (1) generating a tripwire file with the combination of characteristics and (2) storing the tripwire file with the combination of characteristics at the computing device.

In some embodiments, the step of performing the action may include halting backup activities of the backup system. In at least one example, the backup system may perform the step of detecting that the tripwire file has been modified and/or the step of storing the tripwire file at the computing device. In some embodiments, the computer-implemented method may further include (1) notifying, in response to detecting that the tripwire file has been modified, a user of the computing device of the presence of the ransomware on the computing device and (2) enabling the user to recover the file from the copy of the file at the remote storage system.

In one embodiment, a system for implementing the above-described method may include (1) an identifying module, stored in memory, that (a) determines that a backup system periodically backs up at least one file stored at a computing device to a remote storage system by storing a copy of the file at the remote storage system and (b) identifies one or more characteristics of the file backed up by the backup system, (2) a storing module, stored in memory, that stores a tripwire file with the one or more characteristics at the computing device, (3) a determining module, stored in memory, that determines that the file stored at the computing device has likely been encrypted by ransomware executing on the computing device by detecting that the tripwire file has been modified, (4) a preventing module, stored in memory, that performs, in response to detecting that the tripwire file has been modified, an action that prevents the backup system from replacing the copy of the file at the remote storage system with a copy of the encrypted file, and (5) at least one processor that executes the identifying module, the storing module, the determining module, and the preventing module. In some embodiments, the backup system may use the one or more characteristics to identify files that are to be backed up to the remote storage system.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) determine that a backup system periodically backs up at least one file stored at the computing device to a remote storage system by storing a copy of the file at the remote storage system, (2) identify one or more characteristics of the file backed up by the backup system, (3) store a tripwire file with the one or more characteristics at the computing device, (4) determine that the file stored at the computing device has likely been encrypted by ransomware executing on the computing device by detecting that the tripwire file has been modified, and (5) perform, in response to detecting that the tripwire file has been modified, an action that prevents the backup system from replacing the copy of the file at the remote storage system with a copy of the encrypted file. In some embodiments, the backup system may use the one or more characteristics to identify files that are to be backed up to the remote storage system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
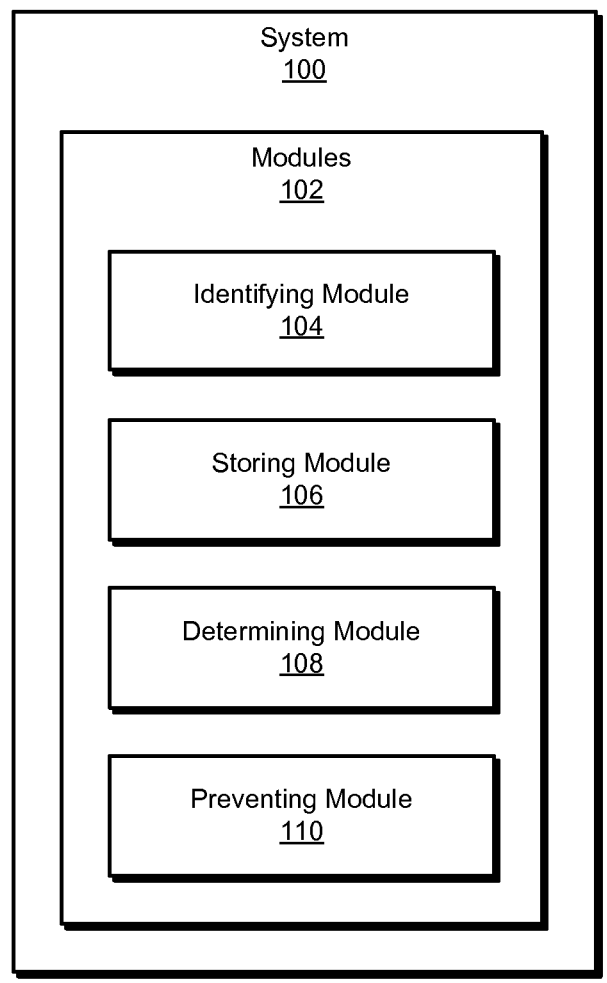
FIG. 1 is a block diagram of an exemplary system for protecting backed-up data from ransomware attacks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for protecting backed-up data from ransomware attacks. As will be explained in greater detail below, by (1) placing a set of tripwire files (e.g., one tripwire file per file type, image, word document, video, etc.) in one or more of a user's backed up directories and (2) detecting a modification to one or more of the tripwire files, the systems and methods described herein may determine that the user's computing system is under ransomware attack and perform one or more actions to protect the user's backed-up data from the ransomware attack. For example, by preventing a backup system from replacing backups of a user's files with backups of ransomware-encrypted versions of the user's files (e.g., by stopping the backup system from backing up files), these systems and methods may enable the user to recover most of the user's files from the backups of the user's files. Embodiments of the instant disclosure may also provide various other advantages and features, as discussed in greater detail below.

Figure 2:
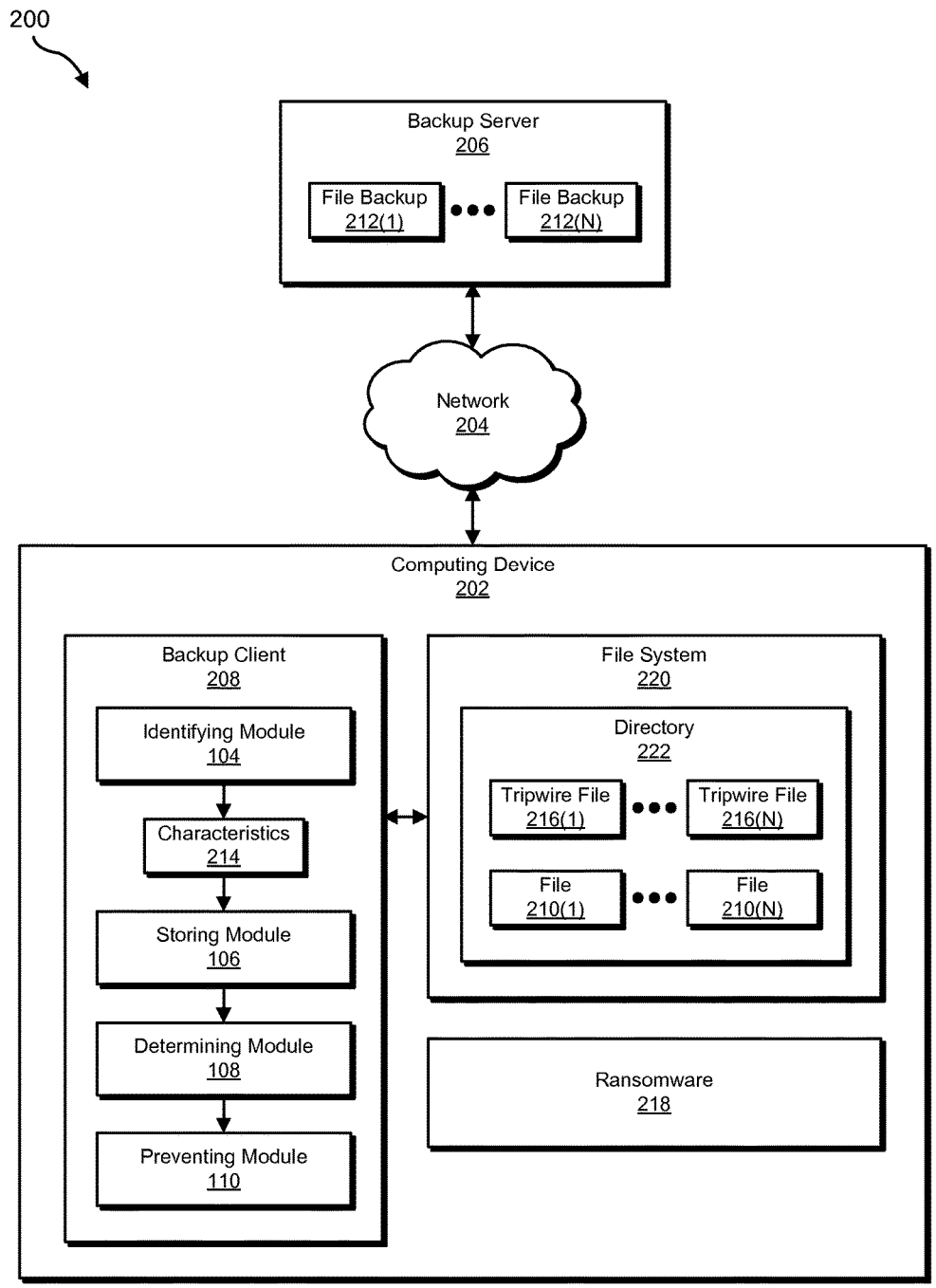
FIG. 2 is a block diagram of an additional exemplary system for protecting backed-up data from ransomware attacks.

The following will provide, with reference to FIGS. 1-2, detailed descriptions of exemplary systems for protecting backed-up data from ransomware attacks. Detailed descriptions of corresponding computer-implemented methods will also be provided in connection with FIGS. 3-7. In addition, detailed descriptions of an exemplary computing system and network architecture capable of implementing one or more of the embodiments described herein will be provided in connection with FIGS. 8 and 9, respectively.

FIG. 1 is a block diagram of an exemplary system 100 for protecting backed-up data from ransomware attacks. As illustrated in this figure, exemplary system 100 may include one or more modules 102 for performing one or more tasks. For example, and as will be explained in greater detail below, exemplary system 100 may include an identifying module 104 that (a) determines that a backup system periodically backs up at least one file stored at a computing device to a remote storage system by storing a copy of the file at the remote storage system and (b) identifies one or more characteristics of the file backed up by the backup system. Exemplary system 100 may also include a storing module 106 that stores a tripwire file with the one or more characteristics at the computing device.

In addition, and as will be described in greater detail below, exemplary system 100 may include a determining module 108 that determines that the file stored at the computing device has likely been encrypted by ransomware executing on the computing device by detecting that the tripwire file has been modified. Exemplary system 100 may also include a preventing module 110 that performs, in response to detecting that the tripwire file has been modified, an action that prevents the backup system from replacing the copy of the file at the remote storage system with a copy of the encrypted file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or backup server 206), computing system 810 in FIG. 8, and/or portions of exemplary network architecture 900 in FIG. 9. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a backup server 206 via a network 204. In one example, computing device 202 may be programmed with one or more of modules 102. Additionally or alternatively, backup server 206 may be programmed with one or more of modules 102.

In one embodiment, one or more of modules 102 from FIG. 1 may, when executed by at least one processor of computing device 202 and/or backup server 206, enable computing device 202 and/or backup server 206 to protect data backed up from computing device 202 to backup server 206 from ransomware attacks. For example, and as will be described in greater detail below, one or more of modules 102 may cause computing device 202 and/or backup server 206 to (1) determine that a backup system (e.g., backup client 208 and backup server 206) periodically backs up files 210(1)-(N) stored at computing device 202 to backup server 206 by storing a copy of each of files 210(1)-(N) as file backups 212(1)-(N), respectively, (2) identify one or more characteristics 214 of files 210(1)-(N), (3) store tripwire files 216(1)-(N) with characteristics 214 at computing device 202, (4) determine that one or more of files 210(1)-(N) have likely been encrypted by ransomware 218 executing on computing device 202 by detecting that one or more of tripwire files 216(1)-(N) has been modified, and (5) perform, in response to detecting that one or more of tripwire files 216(1)-(N) has been modified, an action that prevents the backup system from replacing file backups 212(1)-(N) with copies of encrypted versions of files 210(1)-(N).

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 810 in FIG. 8, or any other suitable computing device.

As illustrated in FIG. 2, computing device 202 may include files 210(1)-(N) that are stored within a directory 222 of a file system 220. As used herein, the term "file" may refer to any unit of data, including, without limitation, files, data objects, images, packages, databases, and documents. The term "directory," as used herein, may refer to any logical container for organizing files within a hierarchy, including, without limitation, folders and directories. As used herein, the term "file system" may refer to any system for organizing, managing, and/or storing files.

Figure 4:
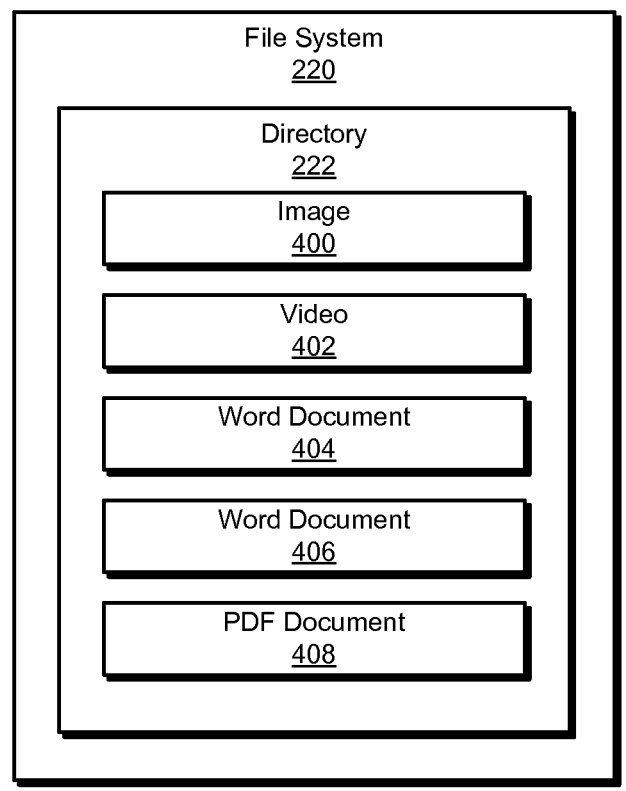
FIG. 4 is a block diagram of an exemplary file system.
Figure 5:
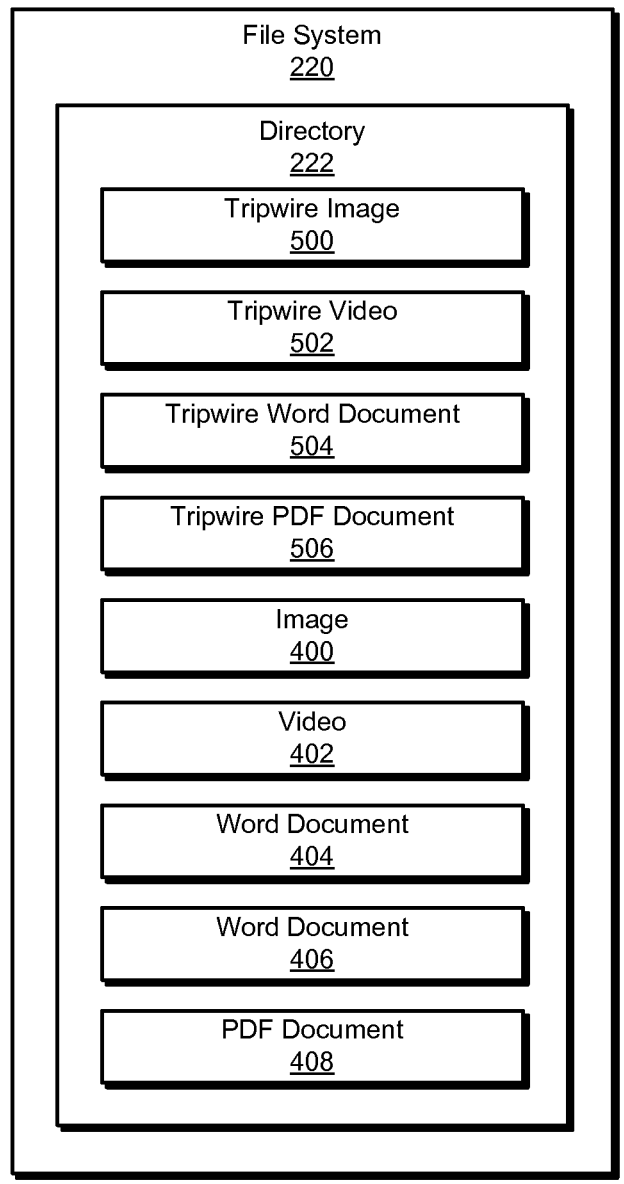
FIG. 5 is a block diagram of exemplary tripwire files stored within a file system.
Figure 6:
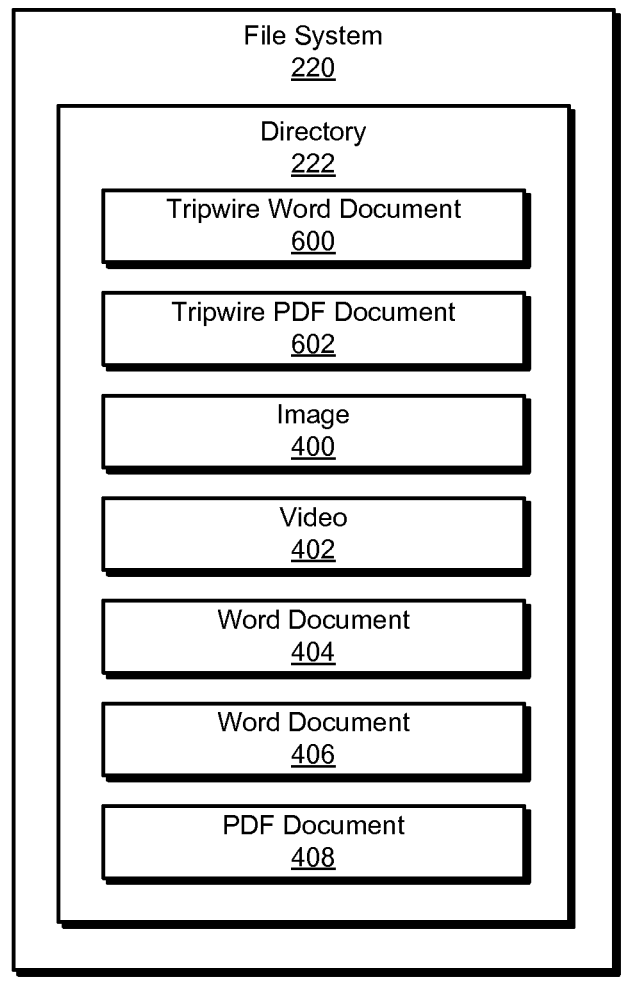
FIG. 6 is a block diagram of exemplary tripwire files stored within a file system.
Figure 7:
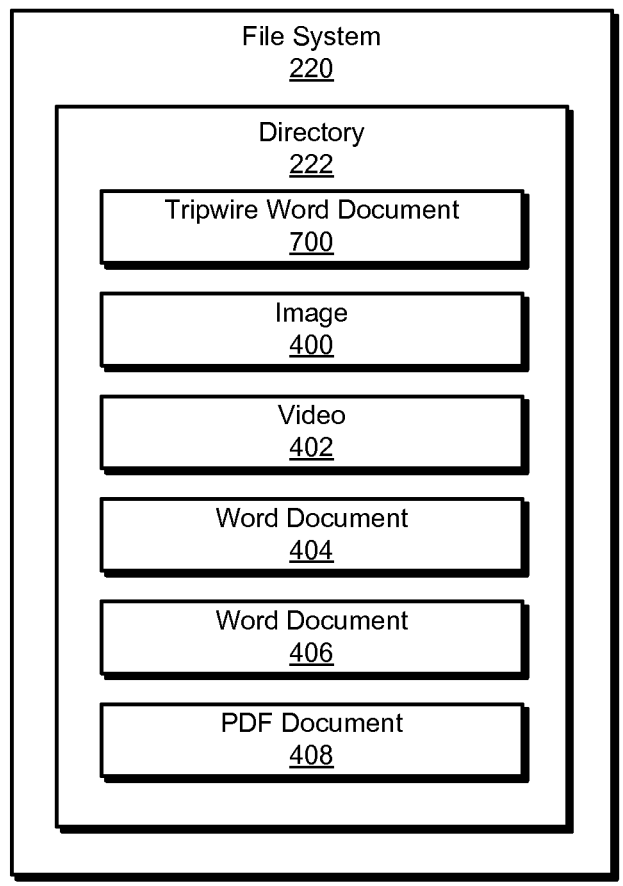
FIG. 7 is a block diagram of an exemplary tripwire file stored within a file system.

FIGS. 4-7 illustrate various examples of the contents of file system 220. FIG. 4 illustrates an example of the contents of file system 220 before any tripwire files have been stored to file system 220. As shown in FIG. 4, file system 220 may contain an image 400, a video 402, word documents 404 and 406, and a Portable Document File (PDF) document 408. FIG. 5 illustrates an example of the contents of file system 220 after a tripwire file for each type of file stored within directory 222 (e.g., tripwire image 500, tripwire video 502, tripwire word document 504, and tripwire PDF document 506) has been added to directory 222. FIG. 6 illustrates an example of the contents of file system 220 after a tripwire word document 600 and a tripwire PDF document 602 has been added to directory 222. FIG. 7 illustrates an example of the contents of file system 220 after a tripwire word document 700 has been added to directory 222.

As shown in FIG. 2, computing device 202 may also include a backup client 208. Backup client 208 may represent any portion of a backup system that is installed on computing device 202 for the purpose of backing up files that are accessible via computing device 202. In some examples, backup client 208 may back up files stored at computing device 202 to backup server 206 according to a schedule and/or when modifications of the files are detected.

Backup server 206 generally represents any type or form of computing device that is capable of storing and/or managing file backups. Examples of backup server 206 include, without limitation, application servers and database servers configured to provide various database services and/or run certain software applications. In the example illustrated in FIG. 2, backup system 206 and backup client 208 may represent portions of a backup system for backing up data. As illustrated in FIG. 2, backup server 206 may include file backups 212(1)-(N) of files 210(1)-(N). File backups 212(1)-(N) may represent time-based or modification-based copies of files 210(1)-(N).

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 900 in FIG. 9, or the like. Network 204 may facilitate communication or data transfer using wireless or wired connections. In one embodiment, network 204 may facilitate communication between computing device 202 and backup server 206.

Figure 3:
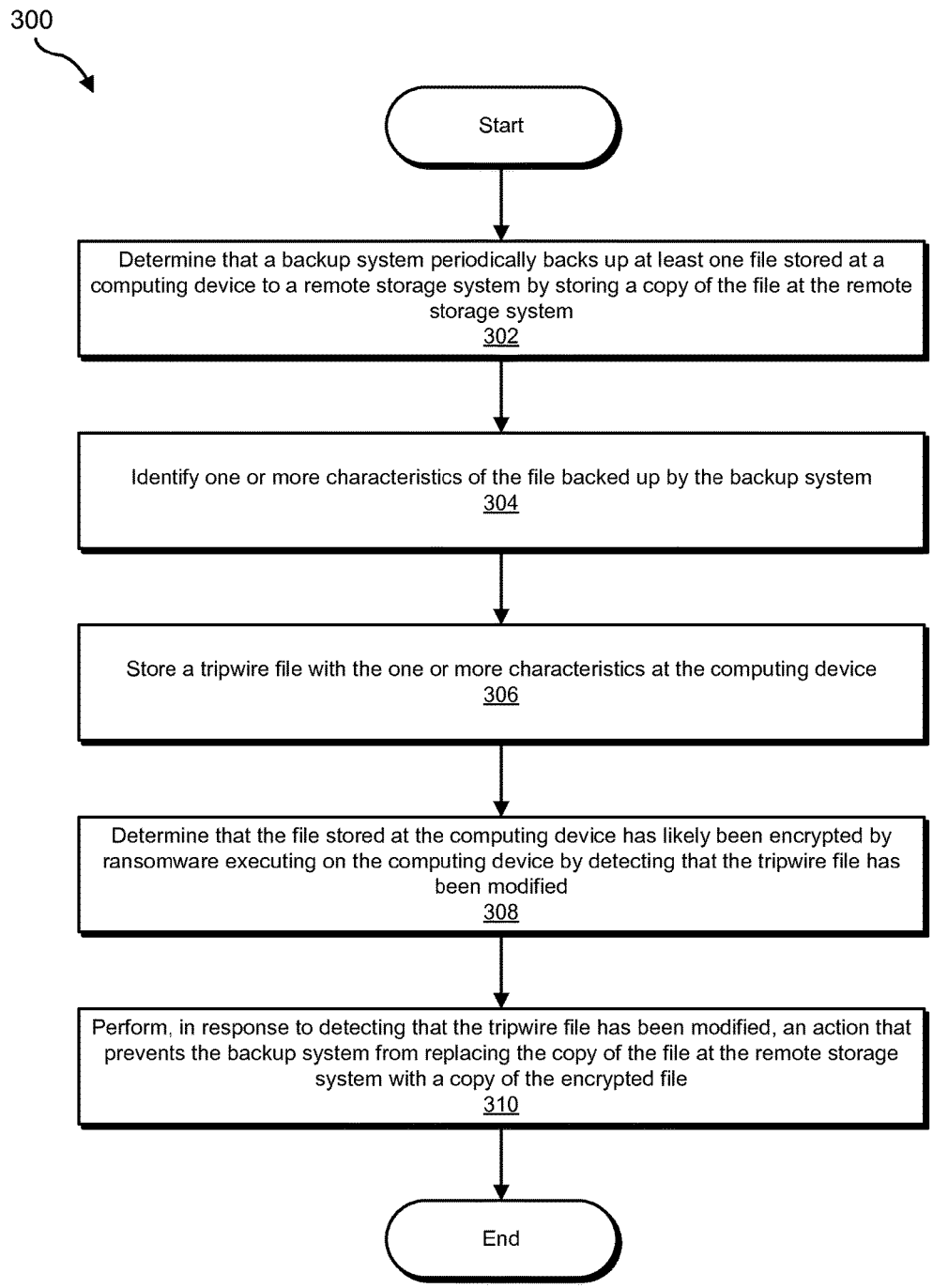
FIG. 3 is a flow diagram of an exemplary method for protecting backed-up data from ransomware attacks.

FIG. 3 is a flow diagram of an exemplary computer-implemented method 300 for protecting backed-up data from ransomware attacks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 810 in FIG. 8, and/or portions of exemplary network architecture 900 in FIG. 9.

As illustrated in FIG. 3, at step 302 one or more of the systems described herein may determine that a backup system periodically backs up at least one file stored at a computing device to a remote storage system by storing a copy of the file at the remote storage system. For example, identifying module 104 may, as part of computing device 202 in FIG. 2, determine that backup client 208 periodically backs up files 210(1)-(N) to backup server 206 by storing file backups 212(1)-(N) to backup server 206.

The systems described herein may perform step 302 in a variety of contexts. In one example, identifying module 104 may determine that a backup system periodically backs up files stored at a computing device to a remote storage system as part of the backup system by determining that the backup system has been configured to back up files stored at the computing device to the remote storage system. For example, identifying module 104 may, as part of an installation or configuration process of backup client 208, determine that backup client 208 and backup server 206 have been configured to back up files stored at computing device 202 to backup server 206. In another example, identifying module 104 may, as part of backup server 206, determine that backup client 208 and backup server 206 have been configured to back up files stored at computing device 202 to backup server 206 by detecting that backup client 208 has been installed on computing device 202 and/or configured to back up files stored at computing device 202 to backup server 206. In at least one example, identifying module 104 may, as part of backup server 206, determine that backup client 208 and backup server 206 have been configured to back up files stored at computing device 202 to backup server 206 by receiving a request to back up files from backup client 208.

Additionally or alternatively, identifying module 104 may determine that a backup system periodically backs up files stored at a computing device to a remote storage system as part of a security system installed on the computing device by detecting a backup client of the backup system that is installed on the computing device and configured to back up files stored at the computing device to the remote storage system. For example, identifying module 104 may, as part of an antivirus system installed on computing device 202, detect backup client 208 that is configured to back up files 210(1)-(N) to backup server 206.

At step 304, one or more of the systems described herein may identify one or more characteristics of the file backed up by the backup system. For example, identifying module 104 may, as part of computing device 202 in FIG. 2, identify characteristics 214 of files 210(1)-(N).

As used herein, the term "characteristic" generally refers to any feature, aspect, or attribute of files that may be used to distinguish between files that are or should be backed up by a backup system from files that are not or should not be backed up by the backup system. Examples of file characteristics may include, without limitation, file names, file types, ages, creation characteristics, access permissions, modification characteristics, size characteristics, location characteristics, relationship characteristics, usage characteristics, ownership characteristics, reputation characteristics, permission characteristics, classifications, tags, fingerprints, and life-cycle characteristics. Typical backup systems may enable a user or administrator to specify one or more combinations of file characteristics that identify the files that the user or administrator wishes to be backed up. For example, a typical backup system may enable a user to select one or more storage locations from which files should be backed up and/or one or more file types of files that should be backed up.

The systems described herein may perform step 304 in a variety of ways and/or contexts. In one example, identifying module 104 may, as part of a backup system, identify characteristics of files backed up by the backup system by identifying one or more combinations of file characteristics that have been provided to the backup system by a user or administrator of the computing device for the purpose of identifying files that the user or administrator wishes to be backed up. For example, identifying module 104 may, as part of backup client 208, determine that a user or administrator of computing device 202 has specified that all files contained within directory 222 should be backed up. Using FIG. 4 as another example, identifying module 104 may determine that a user or administrator has specified that all word and PDF documents within file system 220 should be backed up.

In some examples, identifying module 104 may, as part of a backup system, identify characteristics of files backed up by the backup system by (1) identifying one or more files that are to be backed up by the backup system and (2) identifying one or more combinations of file characteristics of the files. For example, identifying module 104 may, as part of backup client 208, (1) determine that a user or administrator of computing device 202 has specified that all files contained within directory 222 should be backed up and (2) examine the files stored within directory 222 to determine the file types of the files. Using FIG. 4 as an example, identifying module 104 may (1) determine that a user or administrator has specified that all files within directory 222 should be backed up and (2) examine the files within directory 222 to determine that the files have one of an image, video, word document, and PDF document file types.

Additionally or alternatively, identifying module 104 may, as part of a security system, determine one or more combinations of characteristics of the files backed up by a backup system by examining configuration files and/or backup policies of the backup system and/or by querying the backup system for the characteristics.

At step 306, one or more of the systems described herein may store a tripwire file with the one or more characteristics at the computing device. For example, storing module 106 may, as part of computing device 202 in FIG. 2, store tripwire files 216(1)-(N) at computing device 202.

Storing module 106 may store a tripwire file at a computing device in a variety of ways. As used herein, the term "tripwire file" generally refers to any file stored to a computing device for the purpose of detecting ransomware attacks on the computing device. In general, storing module 106 may generate tripwire files with characteristics of the files backed up by a backup system so that (1) the tripwire files resemble other files (e.g., important user-generated files) stored at the computing device that are subject to being backed up by the backup system and/or (2) ransomware executing on the computing device is unable to distinguish between the tripwire files and non-tripwire files. Storing module 106 may store a tripwire file at a computing device in such a way that modifications to the tripwire file will indicate that ransomware has encrypted the tripwire file. In some examples, storing module 106 may store a tripwire file as a hidden file so that users of the computing device are less likely to modify the tripwire file.

As part of storing a tripwire file, storing module 106 may generate one or more hashes of the tripwire file and/or portions of the tripwire file that may later be used to determine whether the tripwire file and/or any portion of the tripwire file has been modified. As used herein, the term "hash" may refer to any type of fingerprint, hash function output, checksum, digital signature, and/or unique identifier of a file or a portion of a file.

In general, storing module 106 may store at least one tripwire file to each directory that is backed up by a backup system. In some examples, storing module 106 may, for each directory that is backed up by a backup system, store one tripwire file for each file type represented in the directory. Using FIGS. 4 and 5 as an example, if backup client 208 is configured to backup all files contained within directory 222, storing module 106 may store a tripwire file for each file type represented in directory 222. In this example, storing module 106 may store tripwire image 500, tripwire video 502, tripwire word document 504, and tripwire PDF document 506 to directory 222 as illustrated in FIG. 5.

In some examples, storing module 106 may, for each directory that is backed up by a backup system, store one tripwire file for each file type that the backup system is configured to back up. Using FIGS. 4 and 6 as an example, if backup client 208 is configured to backup only word and PDF documents within directory 222, storing module 106 may store a tripwire file for each of these file types to directory 222. In this example, storing module 106 may store tripwire word document 600 and tripwire PDF document 602 to directory 222 as illustrated in FIG. 6.

In other examples, storing module 106 may, for each directory that is backed up by a backup system, store a single tripwire file that is of the most common file type represented within the directory. Using FIGS. 4 and 7 as an example, if backup client 208 is configured to backup files within directory 222, storing module 106 may store a single tripwire file to directory 222 that is of the most common file type represented within directory 222. In this example, storing module 106 may store a single tripwire word document 700 to directory 222 as illustrated in FIG. 7.

In some examples, storing module 106 may generate the tripwire files that are stored to a directory using portions of content from other files stored in the directory. For example, storing module 106 may generate a tripwire video that will be stored to a directory using portions of another video already stored to the directory. By generating tripwire files using portions of content from other files, storing module 106 may make it difficult for ransomware to distinguish tripwire files from non-tripwire files.

At step 308, one or more of the systems described herein may determine that the file stored at the computing device has likely been encrypted by ransomware executing on the computing device by detecting that the tripwire file has been modified. For example, determining module 108 may, as part of computing device 202 in FIG. 2, determine that one or more of files 210(1)-(N) stored at computing device 202 have likely been encrypted by ransomware 218 executing on computing device 202 by detecting that one or more of tripwire files 216(1)-(N) have been modified.

The systems described herein may perform step 308 in any suitable manner. In general, determining module 108 may detect that a tripwire file has been modified by generating a hash for the tripwire file and comparing the hash to a prior hash of the tripwire file that was generated when the tripwire file was first created. If the two hashes match, determining module 108 may determine that the tripwire file has not been modified. However, if the two hashes do not match, determining module 108 may determine that the tripwire file has been modified. In the event that determining module 108 detects a modification to one of the tripwire files stored to a computing device, determining module 108 may assume that the computing device is under a ransomware attack and files stored at the computing device are likely encrypted or in the process of being encrypted.

In some examples, when attempting to determine whether a tripwire file has been modified, determining module 108 may break the tripwire file up into blocks and may calculate hashes for each block. Determining module 108 may then compare a hash calculated for an original version of a block with a hash calculated for a current version of a block to determine whether data stored in the block has been modified. If the hashes do not match, determining module 108 may determine that the current version has been modified.

At step 310, one or more of the systems described herein may perform, in response to detecting that the tripwire file has been modified, an action that prevents the backup system from replacing the copy of the file at the remote storage system with a copy of the encrypted file. For example, preventing module 110 may, as part of computing device 202 in FIG. 2, perform an action that prevents backup server 206 from replacing file backups 212(1)-(N) with copies of ransomware-encrypted versions of files 210(1)-(N). Upon completion of step 310, exemplary method 300 in FIG. 3 may terminate.

Preventing module 110 may perform a variety of actions in order to prevent a backup system from replacing a copy of a file at a remote storage system with a copy of a ransomware-encrypted version of the file. In one example, preventing module 110 may prevent a copy of a file at a remote storage system from being replaced with a copy of a ransomware-encrypted version of the file by stopping all backup activities of the backup system. By stopping all backup activities of the backup system, preventing module 110 may prevent a copy of a ransomware-encrypted version of the file from being transmitted to and stored at the remote storage system. This approach may stop all or a majority of a user's ransomware-encrypted files from being backed up to the remote storage system and replacing copies of non-ransomware-encrypted versions of the files, which may enable the user to restore the files from the non-ransomware-encrypted versions of the files. Additionally or alternatively, preventing module 110 may allow a backup system to continue to back up files but instruct the backup system to retain (e.g., by not replacing or deleting) prior backups of the files.

In some examples, preventing module 110 may alert a user of a computing device that the user's computing device is under a ransomware attack and may enable the user to perform one or more actions to stop and/or recover from the attack. In some examples, preventing module 110 may identify files that have been recently modified and/or most likely to have been encrypted by the ransomware and provide the user with an opportunity to recover unencrypted versions of the files.

In some examples, the systems and methods disclosed herein may maintain time-based copies of a user's files at a remote storage system in addition to modification-based copies of the user's files. For example, the systems and methods disclosed herein may maintain a copy of a user's file as it existed a day, a week, or two weeks ago in addition to maintaining copies of the last ten revisions of the file. In this scenario, if copies of the last ten revisions of a file have been replaced by ransomware-encrypted versions of the file, preventing module 110 may enable the user to recover the file from the most recent time-based copy of the file that is not a copy of a ransomware encrypted version of the file.

As explained above, by (1) placing a set of tripwire files (e.g., one tripwire file per file type, image, word document, video, etc.) in one or more of a user's backed up directories and (2) detecting a modification to one or more of the tripwire files, the systems and methods described herein may determine that the user's computing system is under ransomware attack and perform one or more actions to protect the user's backed-up data from the ransomware attack. For example, by preventing a backup system from replacing backups of a user's files with backups of ransomware-encrypted versions of the user's files (e.g., by stopping the backup system from backing up files), these systems and methods may enable the user to recover most of the user's files from the backups of the user's files.

Figure 8:
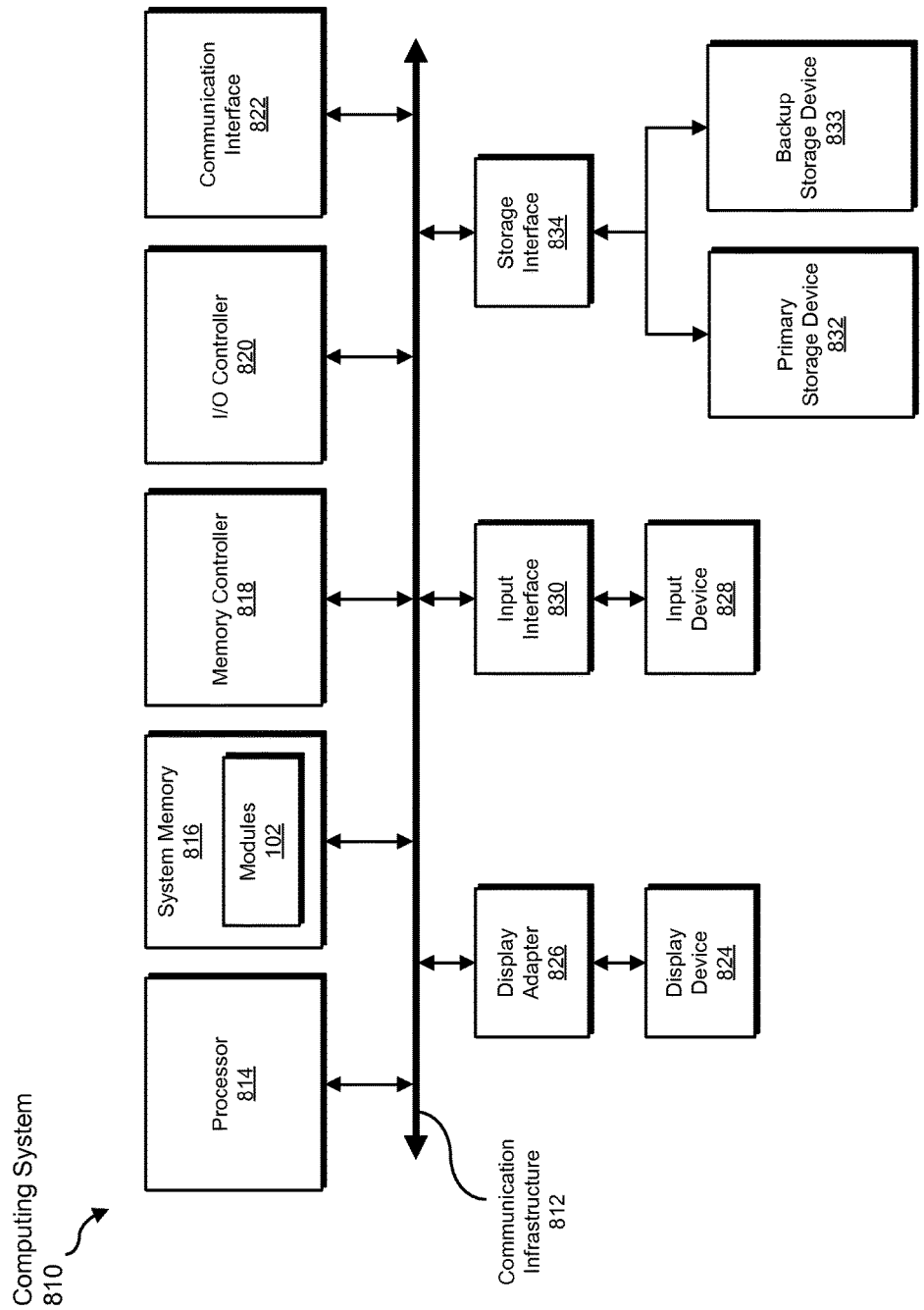
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the exemplary embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an Application Specific Integrated Circuit (ASIC) adapted to implement one or more of the exemplary embodiments disclosed herein.

Figure 9:
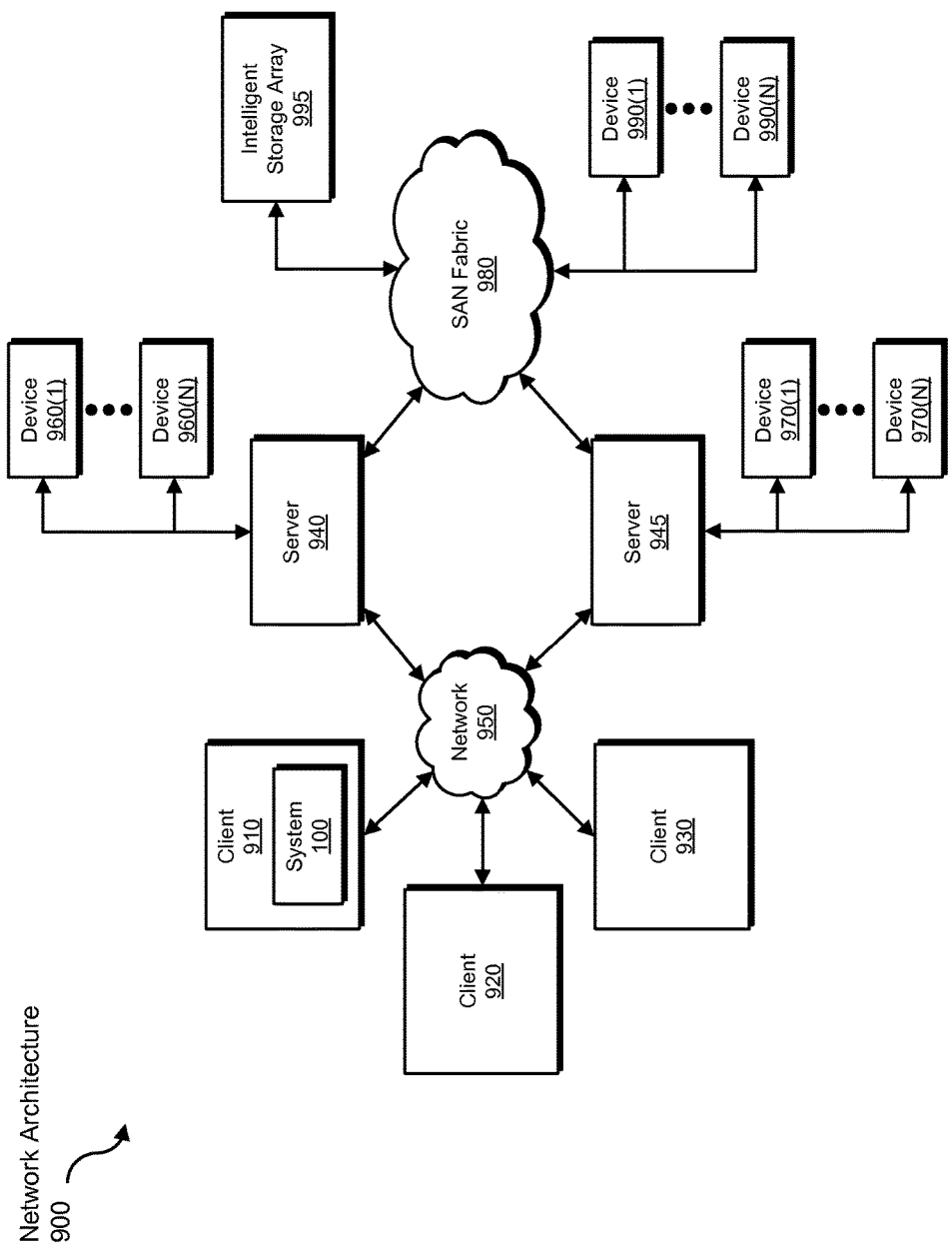
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the instant disclosure.

Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an exemplary method for protecting backed-up data from ransomware attacks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive one or more characteristics of the files of a computing device that are backed up by a backup system, transform the one or more characteristics into one or more tripwire files, output a result of the transformation to the computing device, store the result of the transformation to the computing device, and use the result of the transformation to detect when files on the computing device have likely been encrypted by ransomware executing on the computing device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting backed-up data from ransomware attacks, at least a portion of the method being performed by a computing device comprising at least one processor, the method comprising:
   determining that a backup system periodically backs up at least one file stored at the computing device to a remote storage system by storing a copy of the file at the remote storage system;
   identifying one or more characteristics of the file that are used by the backup system to identify files that are to be backed up to the remote storage system;
   generating a tripwire file having the same one or more characteristics that are used by the backup system to identify files that are to be backed up to the remote storage system;
   storing the tripwire file at the computing device;
   determining that the file stored at the computing device has likely been encrypted by ransomware executing on the computing device by detecting that the tripwire file has been modified;
   performing, in response to detecting that the tripwire file has been modified, an action that prevents the backup system from replacing the copy of the file at the remote storage system with a copy of the encrypted file.

2. The computer-implemented method of claim 1, wherein generating the tripwire file comprises:
   identifying an additional file stored at the computing device with the same one or more characteristics;
   generating the tripwire file from the additional file.

3. The computer-implemented method of claim 1, wherein:
   the one or more characteristics comprise a storage location at the computing device;
   storing the tripwire file at the computing device comprises storing the tripwire file to the storage location.

4. The computer-implemented method of claim 1, wherein:
   the one or more characteristics comprise a file type;
   generating the tripwire file comprises generating the tripwire file with the file type.

5. The computer-implemented method of claim 1, wherein:
   the one or more characteristics comprise the most common file type of files backed up by the backup system;
   generating the tripwire file comprises generating the tripwire file with the most common file type.

6. The computer-implemented method of claim 1, wherein:
   identifying the one or more characteristics of the file comprises identifying every combination of characteristics used by the backup system to identify files that are to be backed up to the remote storage system;
   generating the tripwire file comprises, for each combination of characteristics,
   generating a tripwire file with the combination of characteristics.

7. The computer-implemented method of claim 1, wherein performing the action comprises halting backup activities of the backup system.

8. The computer-implemented method of claim 1, wherein the backup system performs the step of detecting that the tripwire file has been modified.

9. The computer-implemented method of claim 1, wherein the backup system performs the steps of generating the tripwire file and storing the tripwire file at the computing device.

10. The computer-implemented method of claim 1, further comprising:
    notifying, in response to detecting that the tripwire file has been modified, a user of the computing device of the presence of the ransomware on the computing device;
    enabling the user to recover the file from the copy of the file at the remote storage system.

11. The computer-implemented method of claim 1, wherein the tripwire file is unique to the computing device.

12. A system for protecting backed-up data from ransomware attacks, the system comprising:
    an identifying module, stored in memory, that:
       determines that a backup system periodically backs up at least one file stored at a computing device to a remote storage system by storing a copy of the file at the remote storage system; and
       identifies one or more characteristics of the file that are used by the backup system to identify files that are to be backed up to the remote storage system;
    a storing module, stored in memory, that:
       generates a tripwire file having the same one or more characteristics that are used by the backup system to identify files that are to be backed up to the remote storage system; and
       stores the tripwire file at the computing device;
    a determining module, stored in memory, that determines that the file stored at the computing device has likely been encrypted by ransomware executing on the computing device by detecting that the tripwire file has been modified;
    a preventing module, stored in memory, that performs, in response to detecting that the tripwire file has been modified, an action that prevents the backup system from replacing the copy of the file at the remote storage system with a copy of the encrypted file;

at least one processor that executes the identifying module, the storing module, the determining module, and the preventing module.

13. The system of claim 12, wherein the storing module generates the tripwire file by:
   identifying an additional file stored at the computing device with the one or more characteristics;
   generating the tripwire file from the additional file.

14. The system of claim 12, wherein:
   the one or more characteristics comprise a storage location at the computing device;
   the storing module stores the tripwire file at the computing device by storing the tripwire file to the storage location.

15. The system of claim 12, wherein:
   the one or more characteristics comprise a file type;
   the storing module generates the tripwire file by generating the tripwire file with the file type.

16. The system of claim 12, wherein:
   the one or more characteristics comprise the most common file type of files backed up by the backup system;
   the storing module generates the tripwire file by generating the tripwire file with the most common file type.

17. The system of claim 12, wherein:
   the identifying module identifies the one or more characteristics of the file by identifying every combination of characteristics used by the backup system to identify files that are to be backed up to the remote storage system;
   the storing module generates the tripwire file by, for each combination of characteristics, generating a tripwire file with the combination of characteristics.

18. The system of claim 12, wherein the preventing module performs the action by halting backup activities of the backup system.

19. The system of claim 12, wherein the backup system comprises the determining module.

20. A non-transitory computer-readable medium comprising one or more computer-executable instructions that, when executed by at least one processor of a computing device, cause the computing device to:
   determine that a backup system periodically backs up at least one file stored at the computing device to a remote storage system by storing a copy of the file at the remote storage system;
   identify one or more characteristics of the file that are used by the backup system to identify files that are to be backed up to the remote storage system;
   generate a tripwire file having the same one or more characteristics that are used by the backup system to identify files that are to be backed up to the remote storage system;
   store the tripwire file at the computing device;
   determine that the file stored at the computing device has likely been encrypted by ransomware executing on the computing device by detecting that the tripwire file has been modified;
   perform, in response to detecting that the tripwire file has been modified, an action that prevents the backup system from replacing the copy of the file at the remote storage system with a copy of the encrypted file.

* * * * *